United States Patent [19]

Lee

[11] Patent Number: 4,899,600
[45] Date of Patent: Feb. 13, 1990

[54] COMPACT FORCE TRANSDUCER WITH MECHANICAL MOTION AMPLIFICATION

[75] Inventor: Shih-Ying Lee, Lincoln, Mass.
[73] Assignee: Setra Systems, Inc., Acton, Mass.
[21] Appl. No.: 25,846
[22] Filed: Mar. 16, 1987

Related U.S. Application Data

[63] Continuation-in-part of Ser. No. 694,927, Jan. 25, 1985, Pat. No. 4,649,759, which is a continuation of Ser. No. 494,450, May 13, 1983, Pat. No. 4,588,600, which is a continuation-in-part of Ser. No. 359,611, Mar. 18, 1982, Pat. No. 4,463,614, which is a continuation-in-part of Ser. No. 265,087, May 19, 1981, Pat. No. 4,448,085.

[51] Int. Cl.[4] .......................... G01L 1/14; G01G 3/08
[52] U.S. Cl. ............................. 73/862.64; 177/210 C; 177/229
[58] Field of Search ................ 73/862.64; 177/210 C, 177/229; 361/283

[56] References Cited

U.S. PATENT DOCUMENTS

| 3,371,526 | 3/1968 | Fathauer . |
| 3,443,653 | 5/1969 | Marshall . |
| 3,590,933 | 7/1971 | Forman . |
| 3,602,866 | 8/1971 | Saxl . |
| 3,858,097 | 12/1974 | Polye . |
| 3,986,571 | 10/1976 | Strobel et al. . |
| 4,020,686 | 5/1977 | Brendel . |
| 4,022,288 | 5/1977 | Canevari . |
| 4,043,415 | 8/1977 | Luchinger . |
| 4,062,416 | 12/1977 | Berg et al. . |
| 4,062,417 | 12/1977 | Kunz . |
| 4,065,962 | 1/1978 | Shoberg . |
| 4,072,202 | 2/1978 | Storace . |
| 4,143,727 | 3/1979 | Jacobson . |
| 4,153,124 | 5/1979 | Knothe et al. . |
| 4,153,126 | 5/1979 | Knothe et al. . |
| 4,168,518 | 9/1979 | Lee . |
| 4,170,270 | 10/1979 | Sette et al. . |
| 4,184,557 | 1/1980 | Kunz . |
| 4,237,989 | 12/1980 | Lewis . |
| 4,300,648 | 11/1981 | Gallo et al. . |
| 4,308,929 | 1/1982 | Estavoyer ..................... 73/862.64 X |
| 4,343,196 | 8/1982 | Wirth et al. . |
| 4,344,496 | 8/1982 | Langlais et al. . |
| 4,434,451 | 2/1984 | Delatorre . |

FOREIGN PATENT DOCUMENTS

| 1111033 | 8/1984 | U.S.S.R. ........................ 177/210 C |
| 0852233 | 10/1960 | United Kingdom . |
| 1089396 | 11/1967 | United Kingdom . |
| 1909979 | 9/1969 | United Kingdom . |
| 1201308 | 8/1970 | United Kingdom . |
| 1270837 | 4/1972 | United Kingdom . |
| 1351708 | 5/1974 | United Kingdom . |
| 1530796 | 11/1978 | United Kingdom . |
| 2023843 | 1/1980 | United Kingdom . |
| 1563894 | 4/1980 | United Kingdom . |
| 2123157 | 1/1984 | United Kingdom . |

OTHER PUBLICATIONS

Foldvari, Tibor L. et al., "Capacitive Transducers", Instruments and Control Systems, (Nov. 1964) pp. 77–85.

Primary Examiner—Charles A. Ruehl
Attorney, Agent, or Firm—Wolf, Greenfield & Sacks

[57] ABSTRACT

A compact force transducer has at least one flexible beam mounted at one or both its ends to a force summing member or members. The force-to-be-measured is applied to the force summing member along a first axis generally transverse to the beams to deform the beam elastically, without overstressing, through a displacement d. A sensor member carries a conductive surface and is coupled to the beam member. In a parallelogram form, there are a parallel pair of beam members extending between two force summing members and a sensor member is secured to each beam member at or near its point of inflection. One sensor member includes multiple arms that sandwich the other sensor member to produce a linear, push-pull mode of operation. In a low cost cantilevered beam form, the sensor is coupled to the beam at the force summing member in a parallel, spaced relationship. In a hybrid push-pull form, the transducer uses a two beam parallelogram construction with cantilevered sensors (1) coupled rigidly to each beam adjacent one force summing member with a hinge coupling between the beam and this one force summing member, and (2) extending generally in a parallel spaced relationship with respect to an associated one of the beams.

10 Claims, 3 Drawing Sheets

COMPACT FORCE TRANSDUCER WITH MECHANICAL MOTION AMPLIFICATION

REFERENCE TO RELATED APPLICATIONS

This application is a continuation-in-part of U.S. Ser. No. 694,927 filed Jan. 25, 1985 (U.S. Pat. No. 4,649,759), which is a continuation of U.S. Ser. No. 494,450 filed May 13, 1983, now U.S. Pat. No. 4,588,600, which is a continuation-in-part of U.S. Ser. No. 359,611 filed Mar. 18, 1982, now U.S. Pat. No. 4,463,614, which is a continuation-in-part of U.S. Ser. No. 265,087 filed May 19, 1981, now U.S. Pat. No. 4,448,085.

BACKGROUND OF THE INVENTION

This invention relates in general to transducers, and more particularly to high resolution, high accuracy force transducers.

One prior art form of force or weight sensing utilizes a feedback approach using a movable coil in a fixed magnetic field. The coil is movable along a sensing axis and is driven by a current sufficient to maintain a fixed position along the sensing axis. In this configuration, the coil drive current provides a measure of forces applied to displace that coil. While this approach is generally effective, the force sensing configuration is relatively complex and correspondingly expensive.

Another form in the prior art is a strain gage load cell. In this form, however, the accuracy of the load cell is limited by hysteresis and creep of the strain gage sensor material, as well as that of bonding material for the sensor.

Applicant's aforementioned patents describe force transducers having a parallelogram structure utilizing a pair of "force summing" members at each side coupled through a pair of generally parallel, spaced-apart beam members. A relative displacement of the force summing members flexes the beam members. In the form shown, for example, in applicant's U.S. Pat. No. 4,448,085, the force summing members each support a "sensor" member, also formed of a dielectric material. The sensor members overlie one another in a spaced relationship, and carry conductive surfaces to form a capacitance gap. The change in the gap, and hence its capacitance, is directly proportional (a 1:1 correspondence) to the relative displacement d of the force summing members.

In applicant's U.S. Pat. No. 4,558,600, the sensor members are mounted on the beam members, rather than the force summing members, to provide a variation from the aforementioned 1:1 correspondence between the displacement and the gap change. As described there, the motion amplification at the sensor gap that is attainable with this construction is related to the height to width ratio of the transducer.

For certain applications, such as the use of force transducers as the central element of a high quality scale which transforms a force along one axis into a corresponding capacitance value, it is desirable to combine the advantages of the '085 parallelogram construction with the mechanical amplification attainable with the '600 construction while providing a transducer which is nevertheless highly compact.

It is therefore a principal object of the present invention to provide a high resolution, high accuracy force transducer that is both compact and has mechanical motion amplification.

A further principal object of this invention is to provide a force transducer with the foregoing advantages that also provides a push-pull mode of operation while maintaining a parallel plate relationship to provide good linearity, and hence accuracy.

A further object is to provide a force transducer with the foregoing advantages that is readily isolated from atmospheric changes, or can readily compensate for them.

Another object is to provide a force transducer with the foregoing advantages that can also shield the capacitance gap from stray electromagnetic radiation.

Still another object is to provide a force transducer with all of the foregoing advantages which can be manufactured at consistently high quality standards and at a favorable cost from known dielectric materials such as ceramic or quartz.

SUMMARY OF THE INVENTION

A force transducer is formed of a material that is elastically resilient, provided that it is not overstressed. It includes at least one beam member, at least one force summing member, at least one sensor member, and an opposed, spaced apart pair of conductive surfaces or members mounted on these components. A force-to-be-measured applied along a first axis to a force summing member causes a displacement d of the member resisted by a flexure of the beam member or members coupled, preferably integrally, to the force summing member. The point of coupling is preferably the point of maximum angular deformation of the beam for a given displacement d. The flexure of the beam member, which extend along a second axis transverse to the first axis, is generally S-shaped when the force summing members and two beam members form a parallelogram transducer. In this form, the point of inflection, characterized by a zero moment, is at or near a midpoint of the beam members. If the beam member is a cantilevered beam, the point of coupling is at the free end of the beam which is displaced in response to the applied force.

In a preferred parallelogram form, the sensor members are mounted, preferably integrally, on the beam members at or near the point of inflection. One sensor is a single beam-like member, while the other sensor is fork-shaped with a pair of parallel arms that lie on opposite sides of the one sensor. In a related form, the sensor arms are bonded to a mounting stub located at or near the point of inflection. To reduce the risk of overstressing the material in the beam members, they can be formed in a tapered configuration that has its greatest cross-sectional area adjacent the force summing members where the stress concentration during flexure is the greatest. The smallest cross section appears at or near the point of inflection.

In a parallelogram embodiment utilizing a "cantilevered beam" design to achieve amplification and push-pull operation, two sensors are each mounted at the same movable end of the beam members and the beam members are thinned near the coupling to provide a hinge action. Each sensor extends in a parallel, spaced-apart relationship with respect to one associated beam member. Because the sensors are mounted at the tip of the flexed beam members where the angular deformation induced by the displacement d is the greatest and the capacitance sensing gap is located at the opposite ends of the beam members, there is a mechanical motion amplification at the sensing gaps of displacement d (the relative motion of the force summing members). Because of the parallelogram structure and the use of two sensors arranged in this manner, the transducer also provides a push-pull mode of operation.

In yet another, low cost form, the invention can involve a single flexure beam with a single, or even multiple, sensors mounted at a free end of the flexure beam in a parallel, spaced relationship. Displacement of the free end produces a mechanical motion amplification at a capacitance gap formed near the opposite end of the flexure beam and sensor.

In all of these forms, the transducer can employ various arrangements to compensate for, or isolate the transducer from, atmospheric variations and other interferences such as stray electromagnetic fields. For compensation, a fixed gap capacitor may be incorporated into an opening in one of the transducer's structural members. For isolation from atmospherics, the transducer is sufficiently compact that it can be enclosed in a rubber or metal bellows.

These and various other features and objects of the invention will be best understood from the following detailed description which should be read in light of the accompanying drawings.

DETAILED DESCRIPTION OF THE PREFERRED EMBODIMENTS

Figure 1:
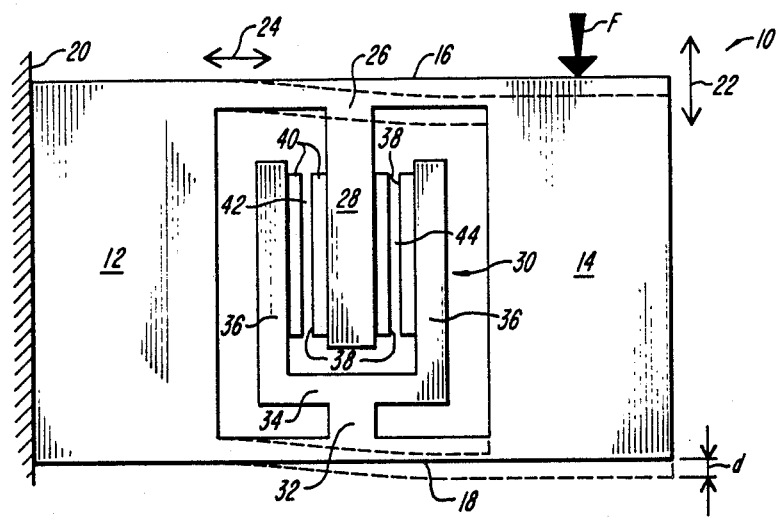
FIG. 1 is a view in side elevation of a force transducer according to the present invention and utilizing a parallelogram construction, mechanical motion amplification, and operating in a push-pull mode.

FIG. 1 shows a force transducer 10 having a generally parallelogram structure formed by a pair of force summing members 12 and 14 connected by a pair of beam members 16 and 18. Preferably this parallelogram structure is formed integrally from a single piece of resilient structural material. In the preferred embodiment, the force summing member 12 is affixed to a stationary reference member 20 and the force summing member 14 is movable along a vertical axis 22 in response to an applied force-to-be-measured F. As shown, the flexure beams have a generally constant cross-sectional area and extend along a generally horizontal axis 24 which is perpendicular to the vertical axis 22. The transducer 10 and its component force summing and flexure beam members have a sufficient thickness in a horizontal direction (orthogonal to the axes 22 and 24) that the transducer rejects all moments and side forces except forces along the axis 22.

The force F produces a downward (as shown in phantom) vertical displacement d of the force summing member 14 with respect to the force summing member 12 which is resisted by a generally S-shaped deformation of the beam members 16 and 18 generally in the plane defined by the axes 22 and 24. It is significant that the coupling between the flexure beams and the force summing members is not of a hinge type, but rather one in which the inherent elasticity of the beam material resists deformation to oppose the applied force. This construction concentrates stresses in the flexure beam near the point at which the beam joins the force summing member and produces a point of inflection, that is, a point where there is a zero moment in the beam member and where the S-shaped beam member exhibits the largest angular deformation. For a symmetrical construction, the point of inflection is at mid-point of each of the beam members.

Each beam member supports a sensor 28 or 30 mounted on the beams and extending generally toward one another generally along the vertical axis 22. In the preferred form as shown, both sensors 28 and 30 are formed integrally with the parallelogram structure of the same material. The upper sensor 28, as shown, has a generally rectangular cross-section and extends downwardly from the point of inflection 26 of the upper beam member 16 toward the lower beam member 18. The lower sensor 30 has a support post 32, a cross piece 34 and, a pair of vertically extending sensor arms 36, in a parallel, spaced apart relationship with respect to the upper sensor 28. The opposed faces of the sensor arms 36,36 and the sensor member 28 each carrying a highly flat conductive surface 38 deposited or otherwise formed on a dielectric surface 40 which is bonded to the sensor arms and sensor members. The conductive surfaces form a pair of variable gap capacitors 42 and 44.

A displacement d of the force summing member 14 produces substantially identical S-shape deformations in the beam members 16 and 18 which is translated into a angular rotation of the sensor members about the point of inflection. The simultaneous rotation of the two sensors cause the gap of the capacitor 42 to close and the gap of the capacitor 44 to open in response to a downward displacement, as shown, of the summing member 14. A characteristic of the construction at the present of the force transducer is that through this deformation and rotation the conductive surfaces 38 forming the capacitors 42 and 44 remain substantially parallel. This condition significantly increases the linearity of the output of the force transducer, whether a current or voltage signal. This condition also enhances the reliability and accuracy of the force measurement produced by the capacitors 42 and 44. Also, this construction produces a push-pull mode of operation in that for a given displacement d along the vertical axis 22, one gap closes in coordination with the opening of the other gap.

It is significant that the force transducer of the present invention is able to yield extremely good performance characteristics while presenting a highly compact construction. This compactness design derives in part from the mechanical amplification provided by the construction and arrangement of the sensors 28 and 30 with respect to the force summing members and beam members.

Figure 6A:
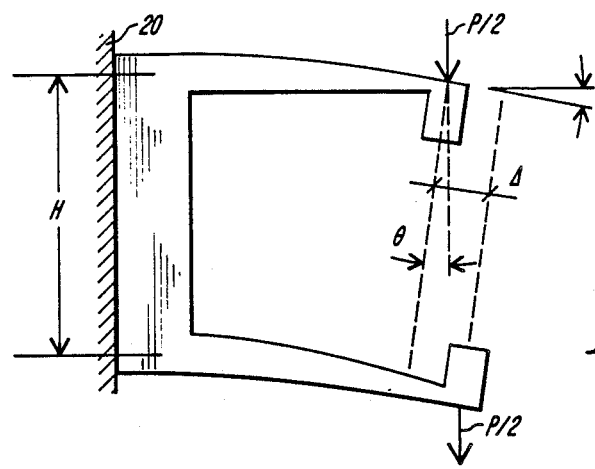
FIGS. 6A and 6B are comparative views in side elevation, respectively, of one half of the transducers shown in either FIGS. 1, 2 or 5.
Figure 6B:
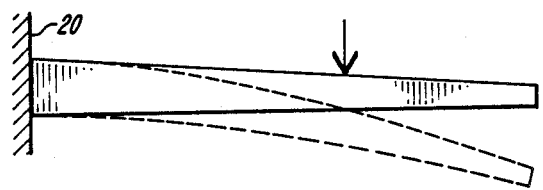

FIGS. 6A and 6B provide a better understanding of certain of the design considerations. First, it can be shown that determining the stresses and deflections of the beam members 16 and 18, "free body" analysis methods can be applied. Each beam can be treated as two cantilever beams with half of the total force applied at the ends of each cantilever. (Note, a cantilever beam behaves in the manner of a diving board, with the maximum angular deformation at the end of the beam. In contrast, in the parallelogram construction described herein, the beam members deform in an S-shaped manner with the point of maximum angular deformation at the point of inflection typically at the midpoint of the beam.) As indicated in FIG. 6A, the change in the capacitance gap, whether that of the capacitor 42 or 44, represented by $\Delta G$ can be shown to be equal to $\theta \cdot H$, where $\theta$ is the angular deflection at the ends of the cantilevers and H is the distance between the beams measured along the vertical axis 22. (The motion illustrated in FIG. 6A is greatly exaggerated for the purposes of clarity.)

One design objective of a force transducer of this type is to maximize the gap change $\Delta G$ without overstressing the material. By attaching the sensor members at the ends of the cantilever beams (in the analysis illustrated by FIG. 6A, the ends of the half beams), the sensor members "extend" the motion of the cantilever beam without the penalty of also introducing additional stress in the material. This can be better seen with reference to FIG. 6B which is a functional equivalent FIG. 6A in this regard. In FIG. 6B, the motion at the tip of the cantilever beam is amplified beyond the point where the force is applied (the mid-point of the beam) by the portion of the beam which extends beyond the midpoint of the free end of the beam. This extended beam portion corresponds to the sensor member attached to the beam member in the FIG. 1 parallelogram construction. The sensor member thus can be viewed as a folded over extension of a cantilever beam (one half of flexure beam 16 or 18). This "folding" introduces compactness by utilizing the vertical "free space" between the upper and lower beam members 16 and 18 in the FIG. 1 embodiment. Since there must be a separation H between the beam members 16 and 18 due to other design requirements such as enhanced moment rejection and an improved linearity of response, the FIG. 6A and FIG. 1 designs utilized an existing vertical spacing to fold over a cantilever beam at right angles and achieve the same amplification one would expect with a more conventional and larger cantilever arrangement as shown in FIG. 6B.

Figure 2:
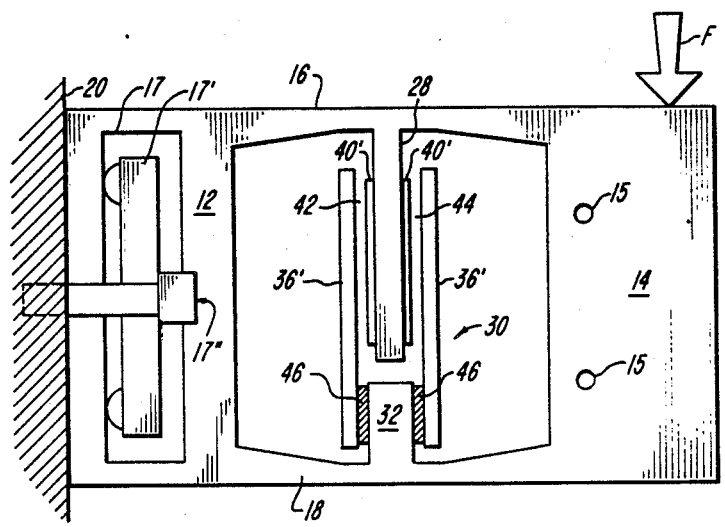
FIG. 2 is a view in side elevation of an alternative force transducer of the same general type as shown in FIG. 1, but utilizing tapered flexural beams and a modified mounting structure for two sensor arms.

FIG. 2 shows an alternative arrangement which is similar in design and operation to the FIG. 1 embodiment. One major difference is that the beam members 16 and 18 are tapered with a larger cross-sectional area adjacent the force summing members and a smaller cross-sectional area at and near the point of inflection. The thicker cross-sectional area is located at the point of maximum stress in the flexure beam and therefore reduces the risk of over-stressing the material. On the other hand, due to the thinned areas of the beam members, this construction will produce a larger angular deformation of the beam members in the attached sensor members for a given applied force or a given displacement of the force summing members along the vertical axis. FIG. 2 also shows mounting features. Holes 15 formed in the force-summing members mount a circuit board or boards (shown in FIG. 5) containing capacitance sensing and temperature compensating circuitry. Opening 17 isolates the transducer from mounting stresses that may arise from clamping the transducer to a support such as the reference member 20 by the clamping plate 17' and mounting screws 17".

Another difference in the FIG. 2 embodiment is that the lower sensor member 30 is formed by cementing two plate like sensor arms 36', 36' onto the side faces of the support post 32' utilizing a suitable cement 46 which preferably not only reliably secures the sensor arms in a fixed position, but also exhibits good thermal compatibility with the other components of the sensor arm. The conductive surfaces 38 can be formed by metalizing the opposed inner surface of the sensor arms 36', 36' and the opposite face of plate like inserts 40', 40' which may also be cemented to the side surfaces of the upper sensor 28 as shown. Preferably the surfaces forming the capacitive gap are lapped to an extremely high degree of flatness. As will be readily appreciated, the construction of FIG. 2 is simpler than that of FIG. 1.

Figure 3:
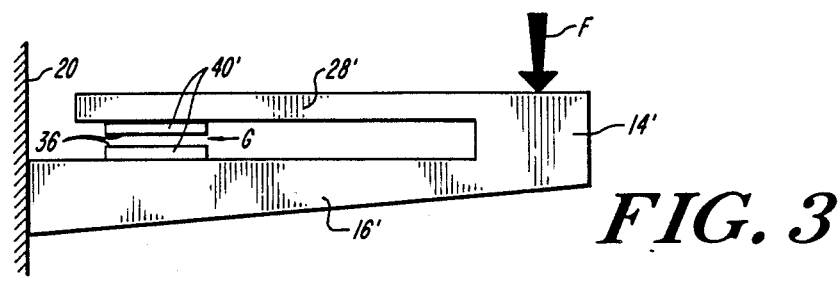
FIG. 3 is a view in side elevation of a single beam force transducer according to the present invention.

FIG. 3 shows another alternative, low cost form of the present invention utilizing a single tapered beam member 16', a force summing member 14', and a single sensor arm 28' which is shown as being formed integrally with the force summing member and the beam member (although it is not necessarily formed integrally) and extends in a parallel spaced relationship to the beam member. As shown in FIG. 3, one end of the beam member, preferably an end having a larger cross-sectional area, is fixed to the reference member 20. The free end of the beam member, having a smaller cross-sectional area, is preferably formed integrally with and merges into the force summing member 14' which couples the beam member to the sensor member. The force-to-be-measured F is applied vertically along axis 22 to the force summing member as shown. As in above described embodiments, this produces a displacement of the force summing member along the vertical axis which in turn produces deformation of the flexure beam which elastically resists the applied force in the manner of a diving board. An opposed pair of dielectric inserts 40', 40' bearing opposed conductive surfaces 38, 38 are located at the free end of the sensor and at a point near the fixed end of the beam member. With this construction, one can achieve a cantilever beam amplification of the displacement at the gap G formed between the conductive surfaces in the manner described with reference to FIG. 6B. This arrangement provides the highly simple and compact force transducer, but it does not provide the advantages inherent in a push-pull mode of operation, nor the moment rejection advantages of the parallelogram construction.

Figure 4:
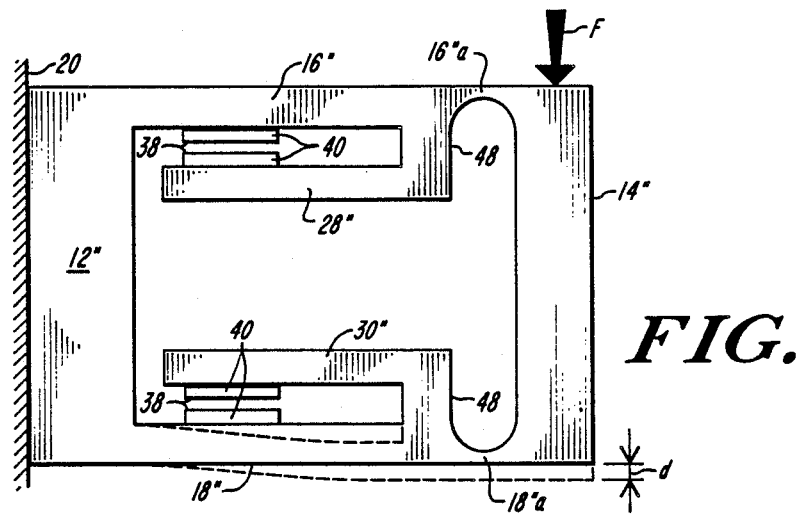
FIG. 4 is a view in side elevation of a parallelogram force transducer utilizing a pair of cantilever beams to produce a motion amplification in the manner of the transducer shown in FIG. 3 and also operating in a push-pull mode.

FIG. 4 illustrates yet another embodiment of a compact force transducer which utilizes both a parallelogram form of construction and a pair of cantilever beams of the general type shown in FIG. 3 mounted on opposite beam members to provide a push-pull mode of operation. In the FIG. 4 embodiment, the force-to-be-measured F is applied to a right force summing member 14" which is displaced by the force F through a distance d with respect to the left hand force summing member 12" secured to the reference number 20. Upper and lower beam members 16" and 18" undergo a "diving board" deflection because they have highly thinned portions 16"a and 18"a adjacent the force summing member 14" which act as hinges. Sensor supports 48,48 are formed integrally with the beam members adjacent the force summing member 14". Each of the beam members 16" and 18" acts in the manner a cantilever beam supported at the force summing member 12. The deflection of the beam members at the point of inflection is amplified by an angular rotation of the sensors supports 48 at the "end" of the beam members and further amplified by the length of the sensor members 28", 30" bearing conductive surfaces 38, 38 on inserts 40, 40 in the same manner as described above with reference to FIG. 3.

Figure 5:
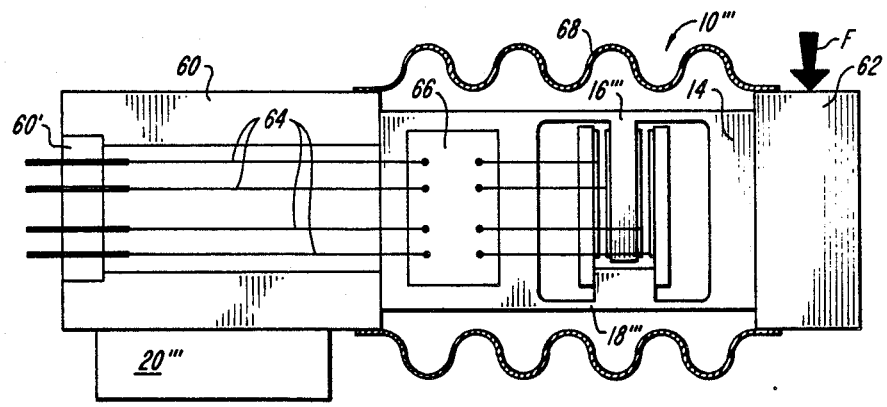
FIG. 5 is a view in side elevation of a force transducer of the type shown in FIG. 2 also showing mounting and isolation arrangements.

FIG. 5 shows a transducer 10''' of the general type shown in FIG. 2 (here, for example, the flexure members 16''', 18''' are not tapered) mounted between a cylindrically shaped sensor support 60 containing a hermetic feed-through 60' and a cylindrically shaped member 62 that receives the force input F and transmits it to the force-summing member 14. Electrical signals pass through the feed-through 60' via conductors 64 connected to a circuit board 66 containing capacitance sensing and temperature compensating circuitry. Sensor support 60 is then mounted to base 20''' by conventional mounting means.

A flexible bellows 68, preferably made from a flexible metal, encloses the transducer 10''' and is sealed to the feed-through 60 and the member 62. The bellows isolates the sensing gaps from atmospheric changes, such as humidity, and if it is metallic, from electromagnetic interference. The bellows is sufficiently flexible that it offers very small resistance, as compared to that of the transducer itself, to the applied force-to-be-measured F.

Figure 7:
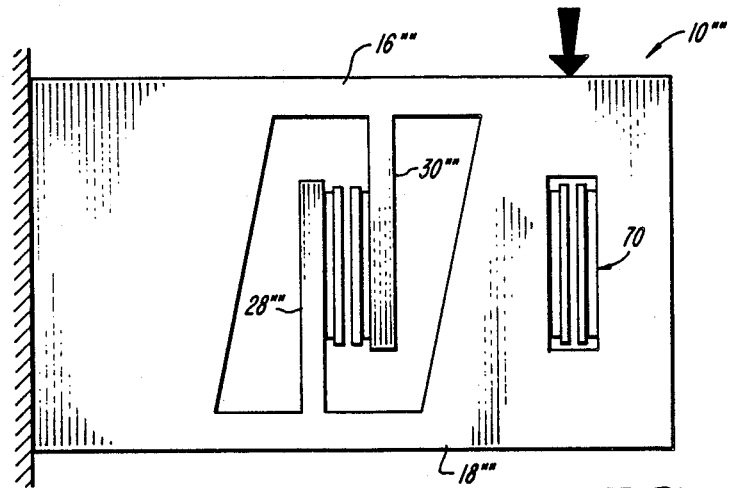
FIG. 7 shows a transducer using sensor arms mounted on the flexible beam members and also having a fixed gap reference capacitor.

A fixed gap reference capacitor 70 is shown in FIG. 7 as part of an alternative arrangement for compensating for temperature variations. The fixed gap provides a reference capacitance to the circuitry 66 to allow a comparison and compensation for atmospheric variations. The reference capacitor is of the type and operates in the manner of the reference capacitors described in U.S. Pat. No. 4,649,759, the disclosure of which is incorporated herein by reference. The transducer 10'''' illustrated in FIG. 7 has only one sensor arm 28'''', 30'''' mounted on each beam member so that it does not operate in a push-pull mode.

There has been described a compact force transducer which uses mechanical motion amplification of the deformation produced by an applied force. In a preferred form, the transducer is in a parallelogram form and can provide a push-pull mode of operation for a highly accurate and linear output. The invention allows the transducer to be readily isolated from atmospheric changes and electromagnetic radiation and can accommodate temperature compensation arrangements.

While the invention has been described with respect to its preferred embodiments, it will be understood that various modifications and variations will occur to those skilled in the art after reading the foregoing disclosure. Such modifications and variations are intended to fall within the scope of the appended claims.

What is claimed is:

1. A force transducer comprising
a pair of rigid force summing members formed of a material which extend generally in a first direction with one of said force summing members receiving a force-to-be-measured along the first direction;
first and second beam members;
said force summing members coupling said beam members to form a parallelogram structure whereby said force-to-be-measured causing said beam members to flex resiliently to produce a relative displacement d of the force summing members with respect to one another measured along said first direction and to produce a counter force to the force-to-be measured, said parallelogram structure being highly resistant to moments and forces tending to cause movement of said beam members not along the first direction,
first and second sensor members rigidly each coupled to an associated one of said first and second beam members when it is flexed through the application of the force-to-be-measured,
a plurality of conductive plates,
said first beam member supporting two of said conductive plates on opposite sides of said first sensor member, and said second sensor member having two arm portions positioned on opposite sides of said first sensor member and each supporting another one of said conductive plates disposed in parallel spaced relationship with said conductive plates on said first sensor member to produce two variable capacitance gaps g, whereby the displacement d simultaneously produces a closing of one of said gaps g and the opening of the other of said gaps g,
said members being oriented and coupled such that conductive plates in said parallel spaced relationship remain substantially parallel during a change $\Delta g$ in said spacing g in response to said displacement d and $\Delta g$, and therefore the associated capacitance, is proportional to the force-to-be-measured.

2. The force transducer of claim 1 wherein the magnitude of said gap change $\Delta g$ is different from the magnitude of the displacement d causing the change.

3. The force transducer of claim 1 wherein said second sensor member is formed integrally and has a generally fork-shaped configuration.

4. The force transducer of claim 1 wherein said second sensor member comprises a support formed integrally with one of said beam members and extending generally in said first direction, a pair of dielectric members located on opposite sides of said first sensor member and each carrying one of said conductive plates, and means for mounting said dielectric members to said support.

5. The force transducer of claims 2 or 3 or 4 wherein said beam members, sensor members and force summing members are formed integrally of a one-piece dielectric material.

6. The force transducer of claim 5 wherein said dielectric material is a ceramic.

7. The force transducer of claim 1 further comprising flexible bellows which surrounds said transducer.

8. A force transducer fixed to a reference member, comprising
a force summing member
at least one beam member fixed to said reference member at one end and rigidly coupled to said force summing member at the opposite end,
said force summing member receiving a force-to-be measured along a first axis which causes said beam member to flex resiliently to produce a displacement d of the force input region measured along said first axis and to produce a counter force to the force-to-be-measured,
at least one sensor member rigidly coupled to said force summing member and therefore to said beam member at said opposite end, said point of coupling being at a point of maximum angular displacement during said displacement, and said at least one sensor member extending in a generally parallel spaced relationship with said beam member, whereby said resilient flexure of said at least one beam member produces a corresponding movement of said at least one sensor member, at least one opposed pair of conductive surfaces where one of said conductive surfaces is carried on said sensor member and the other of said conductive surfaces is carried on said beam member and the surfaces are generally parallel and spaced apart by a distance g to form a variable capacitance gap, said members being oriented and coupled such that during a change $\Delta g$ in said spacing in response to said displacement d due to said resilient flexure of said at least one beam member and said corresponding movement of said at least one sensor member, $\Delta g$, and therefore the associated capacitance, is proportional to the force-to-be-measured.

9. The force transducer of claim 8 wherein said beam member and said sensor member are formed integrally, in one piece, of a dielectric material.

10. The force transducer of claim 9 further comprising second beam and sensor members coupled to said beams and further comprising a vertically extending wall member coupled to all of said beam members at their free ends such that said displacement d produces a simultaneous opening of the gap g between the conductive plates mounted on one pair of said sensor and beam members and closing of the gap g between the plates mounted on the other pair of said sensor and beam members, said beam members having a reduced cross-section adjacent said wall member to act as a hinge during said displacement.

* * * * *